Figure 1:
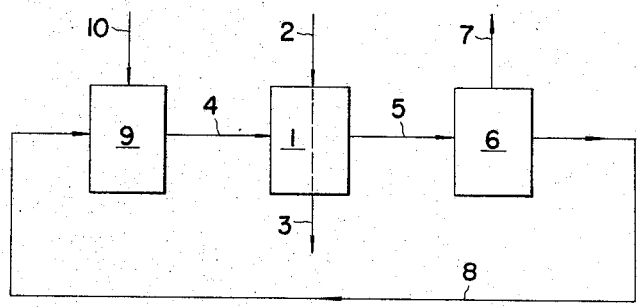

3,336,110
METHOD OF PRODUCING NITROSYL
CHLORIDE
Yoshikazu Ito, Nagoya, Ryoh Endoh, Aichi-gun, Aichi-ken, and Fumio Nishikawa and Mituo Ishikawa, Nagoya, Japan, assignors to Toyo Rayon Kabushiki Kaisha, Tokyo, Japan, a corporation of Japan
Filed Nov. 6, 1962, Ser. No. 235,652
Claims priority, application Japan, Nov. 13, 1961, 36/40,669; Nov. 27, 1961, 36/42,105
3 Claims. (Cl. 23—203)

This invention relates to a method of obtaining nitrosyl chloride at increased rates of generation and in high concentration thereby being advantageous commercially. In accordance with the present invention the nitrosyl chloride is produced from hydrogen chloride and a sulfuric acid solution of nitrosylsulfuric acid, which solution has been obtained by reacting a mixed gas comprising nitrogen monoxide (NO) and nitrogen peroxide ($NO_2$) with sulfuric acid. The present invention also relates to a technique wherein nitrosyl chloride is effectively produced continuously in the above described method by re-using the spent liquor resulting after generation of nitrosyl chloride by recycling the same through the system. More particularly, the invention relates to a method of producing nitrosyl chloride which comprises reacting a mixed gas containing nitrogen monoxide and nitrogen peroxide with sulfuric acid to obtain a sulfuric acid solution of nitrosylsulfuric acid and then reacting said sulfuric acid solution of nitrosylsulfuric acid with hydrogen chloride at a temperature of 50–250° C. under conditions in which the water content of said sulfuric acid solution becomes 2–13% by weight of said solution; and also to a method of producing continuously nitrosyl chloride which comprises again flowing the mixed gas containing nitrogen monoxide and nitrogen peroxide into the spent liquor resulting after generation of nitrosyl chloride by said reaction, thereby forming a cyclic system for the production of nitrosyl chloride and carrying out the reaction continuously while maintaining the water content of the sulfuric acid solution of nitrosylsulfuric acid at 2–13% by weight by removing the excess of water accumulated in the system by adding a step for removing said water at a suitable time either before the generation of nitrosyl chloride or after its generation.

Prior to the present invention various methods have been suggested for the preparation of sulfuric acid solution of nitrosylsulfuric acid, the starting material used when manufacturing nitrosyl chloride. One such prior art method comprises reacting a mixed gas comprising nitrogen monoxide and nitrogen peroxide with sulfuric acid as illustrated below in Equation 1. Still another method proposed for the preparation of nitrosylsulfuric acid is illustrated below in Equation 2.

(1) $NO + NO_2 + 2H_2SO_4 \rightarrow 2HNOSO_4 + H_2O$
(2) $HNO_3 + SO_2 \rightarrow HNOSO_4$ The following is representative of methods used in the prior art to prepare nitrosyl chloride wherein Equation 3 illustrates the use of nitrosylsulfuric acid.

(3) $HNOSO_4 + HCl \rightarrow NOCl + H_2SO_4$
(4) $HNO_3 + 3HCl \rightarrow NOCl + Cl_2 + 2H_2O$
(5) $NO + NO_2 + 2HCl \rightarrow 2NOCl + H_2O$
(6) $2NO + Cl_2 \rightarrow 2NOCl$ Moreover, still another known method for preparing nitrosyl chloride includes using metallic chlorides as the source of chlorine instead of hydrogen chloride.

As a result of research work conducted relative to the preparation of nitrosyl chloride by means of the above Equations 3–6, it was found that instead of the method of Equation 4 which had heretofore been utilized commercially the method covered by the reaction of Equation 3 which hitherto had been hardly developed to any extent commercially could be utilized effectively with advantage. In addition, it was found that when nitrosylsulfuric acid, the starting material of Equation 3, was prepared by the method of Equation 2, the formed nitrosylsulfuric acid was difficult to dissolve in fuming nitric acid and in addition the nitrosylsulfuric acid was obtained in the form of crystals and thus was commercially disadvantageous because of the necessity of separating the crystals from the mother liquor, the operation for removing the nitric acid from the crystals and also the transportation of the crystals. Therefore, our attention having been directed to a method of producing nitrosyl chloride in which the method of preparing nitrosylsulfuric acid by means of Equation 1 and the method of preparing nitrosyl chloride by means of Equation 3 are combined, we furthered our researches along this line.

In preparing nitrosyl chloride by the method of Equation 3, it is advantageous that the sulfuric acid solution of nitrosylsulfuric acid can be obtained without the formation of nitric acid as a by-product, provided that the number of moles of the nitrogen peroxide does not exceed that of the nitrogen monoxide. It is apparent from Equation 1 that water is formed as a by-product in ½ molar equivalent to the nitrosylsulfuric acid, and thus the water content of the sulfuric acid solution of the nitrosylsulfuric acid increases. As a result, the tendency to hydrolysis of the nitrosylsulfuric acid is aggravated. Further, it is known that nitrosyl chloride reacts abruptly with water to decompose into oxides of nitrogen and hydrochloric acid. Therefore, it was common knowledge in the art hitherto, that for advantageously obtaining nitrosyl chloride it was necessary to carry out the reaction in a system the state of which is without water, or even if present, in an amount of no more than 1%, rejecting positively the presence of water in the system of hydrogen chloride and nitrosylsulfuric acid used in the reaction.

However, as a result of further research work regarding the reaction in case of varied rates of contents of water in the four-component system of nitrosylsulfuric acid, sulfuric acid, water and hydrogen chloride, in particularly the reaction in which has been combined the aforesaid Equations 1 and 3, we found that, exactly opposite to what was generally accepted, by positively causing a specified amount of water to be present in preparing nitrosyl chloride, it was possible to enhance markedly the rate of generation of nitrosyl chloride as well as to obtain it in high concentration; and further that, as the amount of said water, 2–13% by weight based on the total weight of the sulfuric acid solution of nitrosylsulfuric acid was advantageous.

It was also found that even in the presence of water in such amounts it was possible to react a sulfuric acid solution of nitrosylsulfuric acid with hydrogen chloride gas at a temperature of 50–250° C. without causing troublesome decompositions as would substantially affect the reaction adversely and that this reaction temperature taken together with the aforesaid water content of 2–13% by weight in an inseparable relationship constituted a very important and novel condition in producing nitrosyl chloride by combining the reactions of the aforesaid Equations 1 and 3. Additionally, it was found that the reaction conditions in which said water content was 4–11% by weight and the reaction temperature when reacting with the hydrogen chloride gas was 80–200° C. was particularly suitable.

Further, it was found that by carrying out the reaction by electing the method in which has been combined the reactions of Equations 1 and 3 while maintaining the aforementioned water content and reaction temperature, the continuous production of nitrosyl chloride becomes possible by recycling the spent liquor resulting after generation and obtaining of the nitrosyl chloride; and that in carrying out such a continuous production operation the dehydration step for maintaining the foregoing water content could be carried out commercially very advantageously and effectively without causing undesirable decompositions of the nitrosylsulfuric and/or nitrosyl chloride, or without substantially any loss of the sulfuric acid.

Accordingly, it is an object of the present invention to provide a method of commercially producing advantageously and effectively nitrosyl chloride by combining the reactions of the above described Equations 1 and 3.

Another object of this invention is to provide a method in which, in generating and obtaining nitrosyl chloride by means of such a composite method from hydrogen chloride and a sulfuric acid solution of nitrosylsulfuric acid, obtained by reacting a mixed gas comprising nitrogen monoxide and nitrogen peroxide with sulfuric acid, the reaction of the sulfuric acid solution of nitrosylsulfuric acid with hydrogen chloride can be carried out at a high reaction speed in the presence of water in an amount within a specified range and under temperature conditions of specified range whereby nitrosyl chloride is obtained in high concentration.

A further object of the invention is to disclose the aforesaid specified ranges of water content and temperature conditions as well as to provide by means of such a reaction a commercially feasible method of producing continuously with advantage and effectiveness nitrosyl chloride.

Other objects and advantages of the present invention will become apparent from the description which follows.

The mixed gas comprising nitrogen monoxide and nitrogen peroxide which is used in the present invention may be used by mixing nitrogen monoxide (NO) and nitrogen peroxide ($NO_2$); or nitrogen monoxide (NO) and oxygen ($O_2$) may be mixed and likewise used since it becomes a mixed gas which also contains nitrogen monoxide and nitrogen peroxide. Or the gas in the form of nitrogen sesquioxide ($N_2O_3$) is used with similar results, though it is of advantage commercially to use "Nitrose gas" (in which is present nitrogen sesquioxide maintaining a balanced relationship) containing nitrogen monoxide and nitrogen peroxide, which is obtained usually by the oxidation of ammonia with air. Again, the presence of other oxides of nitrogen, say $N_2O$, which do not participate in the reaction, are also permissible, it being likewise possible to use the spent gas of other industries also so long as they contain nitrogen monoxide (NO) and nitrogen peroxide ($NO_2$). While it is preferable for the molar ratio of the nitrogen monoxide and nitrogen peroxide in the mixed gas to be about 1:1, on the other hand, as the purity of the nitrosyl chloride will be lowered, it is not desirable for the molar ratio, especially of the nitrogen peroxide to the nitrogen monoxide, to be so great that the nitrogen peroxide is present in an excessive amount such that it gives rise to the formation of nitric acid, a by-product, in the sulfuric acid solution of nitrosylsulfuric acid in an amount greater than 5% by weight thereof.

According to the method of the present invention, a mixed gas comprising nitrogen monoxide and nitrogen peroxide, as described hereinbefore, is introduced into sulfuric acid and the reaction of the aforesaid Equation 1 is effected to obtain a sulfuric acid solution of nitrosyl- sulfuric acid. While the reaction may be carried out satisfactorily at room temperature and atmospheric pressure, it is of advantage to perform it at a temperature of 30–50° C., as the rate of absorption of the mixed gas is enhanced. While there is no particular restriction as to the concentration of the sulfuric acid so long as the water content of the sulfuric acid solution of nitrosylsulfuric acid formed does not depart from the range of 2–13% by weight of said solution, normally concentrated sulfuric acid, pure sulfuric acid, or fuming sulfuric acid can be used singly or as a mixture thereof. Moreover, since in the case the continuous process is adopted, a dehydration step is provided either before or after the nitrosyl chloride generating step, the use of a much greater range of concentrations becomes possible. However, the aforesaid water content must not depart from the range of 2–13% by weight which is one of the important conditions for attaining the objects of the present invention.

The sulfuric acid solution of nitrosylsulfuric acid which has been obtained is reacted with hydrogen chloride gas at a temperature of 50–250° C. under conditions in which the water content of said solution is 2–13% by weight, preferably at a temperature of 80–200° C. under conditions in which the former is 4–11% by weight. The reaction time is usually on the order of 15–60 minutes. The reaction can be satisfactorily carried out by blowing hydrogen chloride gas into the foregoing solution. Although the gas may contain some water so long as the water content in said solution does not exceed 13% by weight, due to the fact that increases in the water content and temperature beyond hereinbefore-specified ranges for the water content and temperature of the present invention accelerate the decomposition of nitrosylsulfuric acid and/ or nitrosyl chloride, it is advisable to blow in as anhydrous a gas as possible.

Normally, in generating nitrosyl chloride by passing hydrogen chloride through a sulfuric acid solution of nitrosylsulfuric acid, owing to the fact that the reaction is controlled by the equilibrium of the four-component sulfuric acid-nitrosylsulfuric acid-nitrosyl chloride-hydrogen chloride system, when the concentration in the sulfuric acid solution of the nitrosylsulfuric acid used declines, nitrosyl chloride of a correspondingly low concentration is obtained. However, according to the method of the present invention water present in the sulfuric acid solution of nitrosylsulfuric acid in an amount of 2–13% by weight acts advantageously in the direction of increasing the reaction speed of the reaction equilibrium system of the aforesaid Equation 3 consisting of nitrosylsulfuric acid and hydrogen chloride thereby increasing conspicuously the rate of formation of nitrosyl chloride. This nitrosyl chloride generating reaction is carried out at a temperature of 50–250° C., preferably 80–200° C.

A description in further detail will be made concerning the effects of the aforesaid water content and reaction temperature on the reaction, reference being had to the accompanying drawings.

Figure 2:
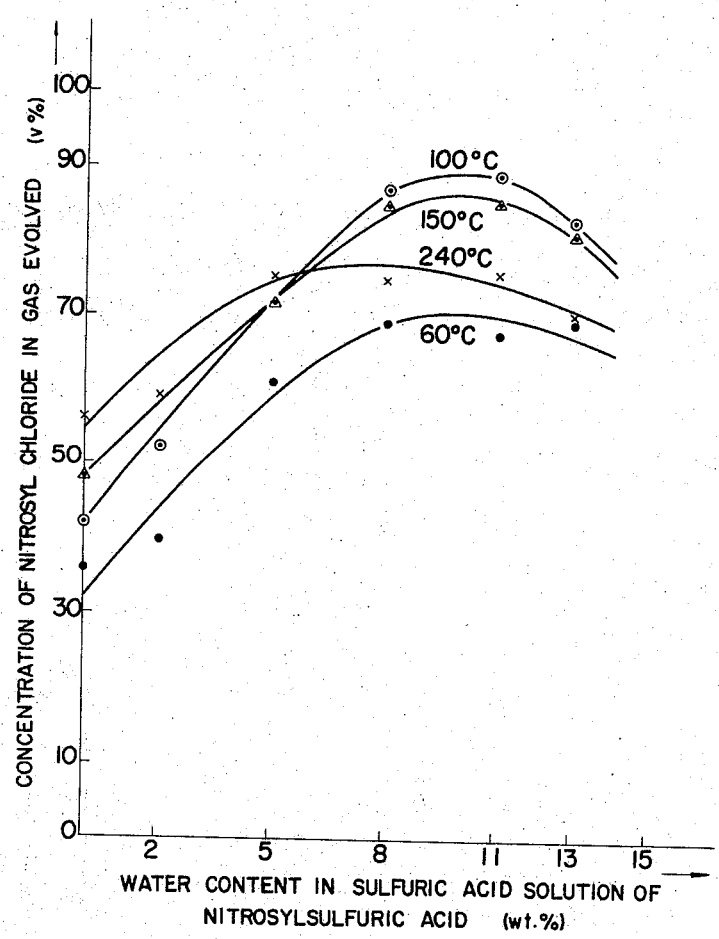
Figure 3:
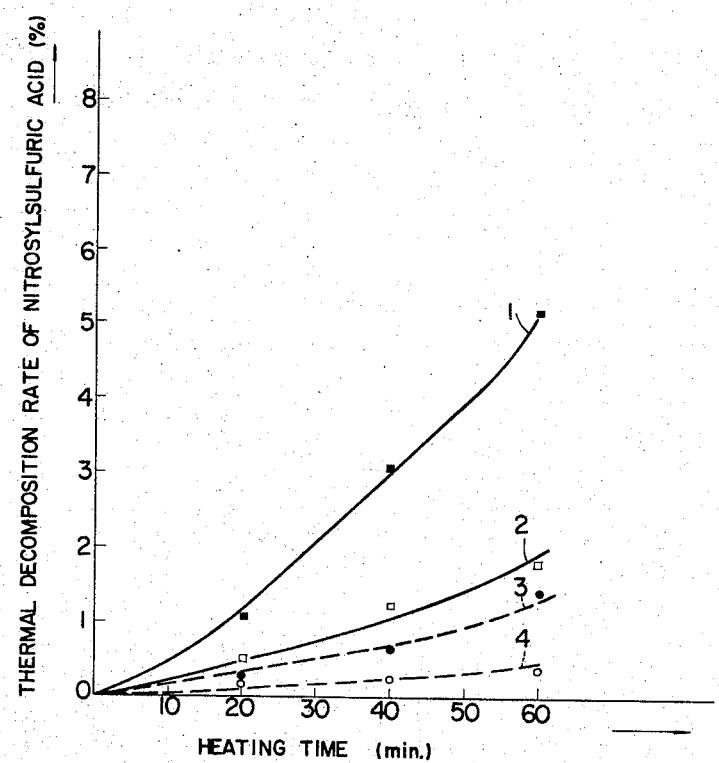
Figure 4:
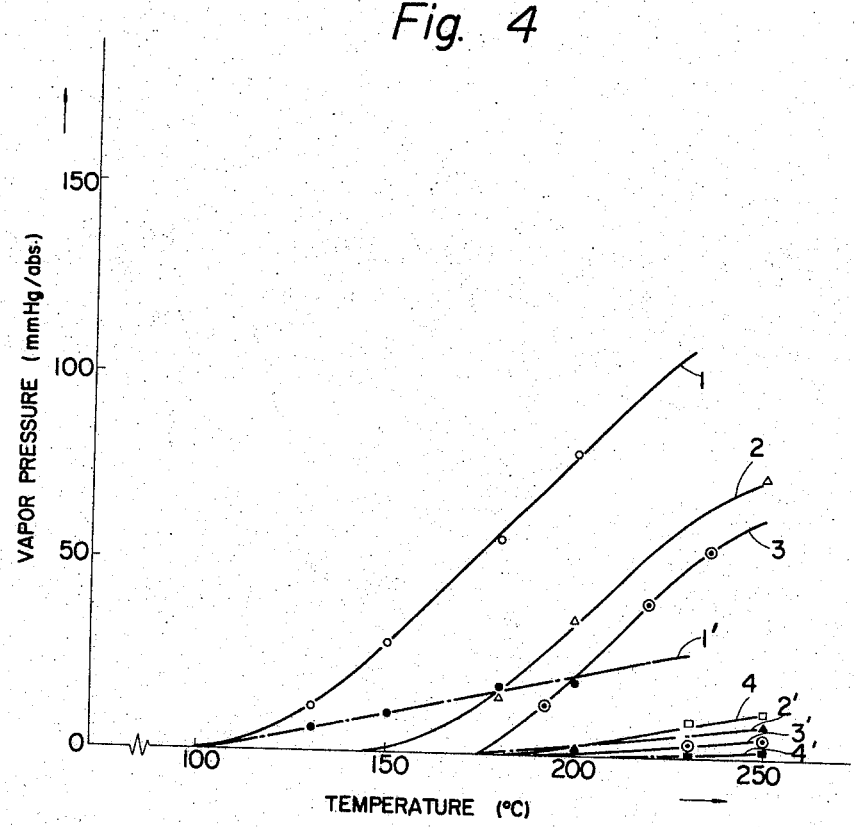

FIG. 1 is a flow chart descriptive of the method of the present invention when carried out by the continuous process; FIG. 2 is a graph showing the relationship between the changes in the water content (wt. percent) of the sulfuric acid solution of nitrosylsulfuric acid and the changes in the concentration (vol. percent) of nitrosyl chloride in the generated gas; FIG. 3 is a graph showing the rate of thermal decomposition of nitrosylsulfuric acid; and FIG. 4 is a graph showing the changes in the vapor pressure in a sulfuric acid solution of nitrosulfuric acid.

FIG. 2 is that in which have been plotted the results as shown in Table I, below, of the concentration of nitrosyl chloride at 10 minutes after start of its generation in the case 200 grams of a sulfuric acid solution of nitrosylsulfuric acid was placed in a reactor the capacity of which was about 200 cc. and while maintaining the respective temperatures of 60°, 100°, 150° and 240° C., hydrogen chloride was blown into said solution at the rate of 30 cc. per minute.

TABLE I

| Composition (percent) | | | Temperature (° C.) | | | |
|---|---|---|---|---|---|---|
| HNOSO$_4$ | H$_2$SO$_4$ | H$_2$O | 60 | 100 | 150 | 240 |
| | | | NOCl (percent) | | | |
| 40 | 60 | 0 | 36 | 42 | 48 | 56 |
| 40 | 58 | 2 | 40 | 55 | -------- | 59 |
| 40 | 55 | 5 | 61 | 72 | 72 | 75 |
| 40 | 52 | 8 | 69 | 87 | 85 | 75 |
| 40 | 49 | 11 | 68 | 89 | 86 | 76 |
| 40 | 47 | 13 | 70 | 83 | 81 | 69 |

As is apparent from Table I and FIG. 2, above, it can be seen that the concentration (vol. percent) of the intended nitrosyl chloride in the gas that is generated by passing hydrogen chloride gas into a sulfuric acid solution of nitrosylsulfuric acid to generate nitrosyl chloride increases as the water content (wt. percent) of the sulfuric acid solution of nitrosylsulfuric acid increases, manifesting a maximum concentration in the neighborhood where the water content is about 8–11% by weight and thereafter shows a decrease. It is also apparent that as the temperature increases from 60° to 100° C. the concentration of the nitrosyl chloride generated increases, but after attaining its maximum in the neighborhood of 100° C., thereafter as the temperature continues to rise a tendency to decline is noted. Thus, it can be seen that the concentration of the nitrosyl chloride formed both at relatively low temperatures as well as at relatively high temperature decreases. Thus, as regards the copresence of water there also exists a suitable range for the water content that manifests the maximum concentration of the nitrosyl chloride. And when the temperature becomes less than 50° C. the concentration of the nitrosyl chloride generated decreases markedly. On the other hand, when the temperature exceeds 250° C., the concentration likewise shows a pronounced decrease. Therefore, the temperature condition of 50–250° C. is used according to the method of the present invention. When considered only from the standpoint of the generation of nitrosyl chloride, while still higher temperatures can be used, taken in connection with the presence of water there occurs disadvantages resulting from the decomposition of nitrosylsulfuric acid and/or nitrosyl chloride at high temperatures thereby making it substantially impossible to ignore the admixture into the nitrosyl chloride generated of the resulting decomposed gas and the adulteration of the nitrosyl chloride thereby. In addition, this temperature condition is also intimately related to the aforementioned water content, it being best to effect the reaction at the relatively lower temperature end of the aforesaid temperature range in case the water content is large, whereas when the water content is relatively small it being an advantage to effect the reaction at the relatively higher temperature end of the aforesaid temperature range.

In FIG. 3 is shown the relationship between the heating time and the rate of thermal decomposition of the nitrosylsulfuric acid in the sulfuric acid solution at temperatures of 200° C. and 250° C. and water contents of 2% and 12% by weight. The data for showing this relationship was obtained by taking 50 grams of a sulfuric acid solution of nitrosylsulfuric acid, placing the same in a thermostatic vessel from which, while maintaining a given temperature, samplings were made at fixed intervals of time and determinations of the concentrations of nitrosylsulfuric acid were made. What is meant as the rate of thermal decomposition is the ratio expressed in percentage of the weight of the decomposed nitrosylsulfuric acid to the weight of the initial nitrosylsulfuric acid in the sulfuric acid solution of nitrosylsulfuric acid. The composition and rate of thermal decomposition of each of the samples are shown in Tables II and III, below.

TABLE II

| Sample No. | Composition | | | Temperature (° C.) |
|---|---|---|---|---|
| | HNOSO$_4$ (percent) | H$_2$SO$_4$ (percent) | H$_2$O (percent) | |
| 1 | 32 | 56 | 12 | 250 |
| 2 | 32 | 56 | 12 | 200 |
| 3 | 32 | 66 | 2 | 250 |
| 4 | 32 | 66 | 2 | 200 |

TABLE III.—RATE OF THERMAL DECOMPOSITION

| Sample No. | Time (min.) | | |
|---|---|---|---|
| | 20 | 40 | 60 |
| 1 | 1.25 | 3.10 | 5.20 |
| 2 | 0.55 | 1.20 | 1.90 |
| 3 | 0.30 | 0.70 | 1.40 |
| 4 | 0.15 | 0.25 | 0.40 |

In FIG. 3, curve 1 is the result of sample No. 1, curve 2, of sample No. 2, curve 3, of sample No. 3, and curve 4, of sample No. 4. As is apparent from Tables II and III, above, and the FIG. 3 of the accompanying drawings, it can be seen that with the water content within the range of the method of the present invention, the rate of thermal decomposition of nitrosylsulfuric acid is no more than about 5% even under the conditions wherein the heating extends to 60 minutes and the presence of 12% by weight of water. Therefore, under normally preferred operating conditions the reaction is satisfactorily carried out with a rate of thermal decomposition the extent of which can be practically ignored. Thus, even though the decomposition of nitrosyl chloride is considered, with a thermal decomposition rate at most of no more than about 1% the rate of generation of the nitrosyl chloride can be increased with marked advantage and the production of nitrosyl chloride in high concentrations is made possible.

Although the method of this invention can be carried out by means of either the batch or the continuous process, commercially it is an advantage to carry out the continuous process which comprises following the generation of nitrosyl chloride by reacting a sulfuric acid solution of nitrosylsulfuric acid with hydrogen chloride gas, then again blowing a mixed gas containing nitrogen monoxide and nitrogen peroxide into the spent liquor resulting after the generation of nitrosyl chloride as above to thereby form a cyclic system for the production of nitrosyl chloride and removing the excess water accumulating in the system by adding a step at a suitable time either before the generation of nitrosyl chloride or after its generation thereby maintaining the water content of the sulfuric acid solution of nitrosylsulfuric acid at 2–13% by weight.

This step for removing the water may be by vacuum distillation under heating and reduced pressure conditions of a temperature of 120–250° C. and a reduced pressure of 20–300 mm. Hg absolute, respectively. Alternatively the removal of water may be accomplished by blowing into the cyclic system at 150–300° C. one or more dehydrated inert gases of the group consisting of nitrogen, air and carbon dioxide. Alternatively, it is also possible to add at an optional place in the cycling system a step in which is added singly or as a mixture a compound selected from the group consisting of anhydrous sulfuric acid and fuming sulfuric acid whereby not only the function of replenishing the operational loss of the sulfuric acid is accomplished but also the function in which, as sulfuric acid, dehydrating effects are manifested in removing the water from the system is achieved to maintain the water content at 2–13% by weight. Of course, there is naturally a limit as to the dehydrating effects that can be achieved by such a method, and when such a method is to be adopted for removing the water that accumulates in a continuous process other dehydrating means, as already described, will be required. Except in those cases when anhydrous sulfuric acid and fuming sulfuric acid are intended for achieving especially the dehydrating effects also, they need only be replenished to make up for the operational loss at such times as required.

In spite of the fact that it can be anticipated that undesirable phenomena such as the distilling off of sulfuric acid and the decomposition of the nitrosylsulfuric acid of the sulfuric acid solution would occur normally in dehydrating under such conditions according to the method of utilizing the vacuum distillation during the dehydration step, it is possible to maintain the water content range in accordance with the present invention satisfactorily without the distilling off of sulfuric acids in amounts that cannot be ignored and the occurrence of the decomposition of nitrosylsulfuric acid. FIG. 4 illustrates the results of measurements made of the vapor pressures of the water and sulfuric acid contained in the sulfuric acid solution of nitrosylsulfuric acid when carrying out such a vacuum distillation; curves 1 and 1' showing the vapor pressure of $H_2O$ (mm. Hg) and vapor pressure of $H_2SO_4$ (mm. Hg), respectively, of the sulfuric acid solution of nitrosylsulfuric acid of the composition given in Table IV; curves 2 and 2' showing similarly that of Table V: curves 3 and 3', that of Table VI; and curves 4 and 4', that of Table VII.

TABLE NOS. IV–VII

| Composition | IV | V | VI | VII (Control) |
|---|---|---|---|---|
| $HNOSO_4$ | 40.0 | 40.0 | 40.0 | 40.0 |
| $H_2SO_4$ | 47.0 | 58.0 | 52.5 | 58.5 |
| $H_2O$ | 13.0 | 2.0 | 7.5 | 1.5 |

As is apparent from FIG. 4, when comparison is made of curves 1 and 1', curves 2 and 2', and curves 3 and 3', there exists pronounced differences between the vapor pressures of the water and sulfuric acid contained in the sulfuric acid solution of nitrosylsulfuric acid. Hence, it can be seen that dehydration by vacuum distillation can be conveniently carried out under conditions in which the distilling off of sulfuric acid can be practically ignored. However, as is apparent when the curves 4 and 4', a control, are compared, the vapor pressures of the two being proximate, the advantages of dehydration by vacuum distillation in the method of the present invention would no longer be possible within the temperature range in which the decomposition of nitrosylsulfuric acid could be restrained, i.e., of less than about 250 C., at less than the water contents of the method of this invention.

Next, one example of a method of carrying out on a commercial scale the method of the present invention by the continuous process will be described with reference to FIG. 1, a flow diagram descriptive of such a process.

When a sulfuric acid solution 4 comprising 25–50% by weight of nitrosylsulfuric acid, the concentration of which sulfuric acid in the sulfuric acid-water system is 80–98%, is reacted with hydrogen chloride 2 in a nitrosyl chloride generating apparatus 1 at about atmospheric pressure and a temperature of 50–250° C., preferably 80–280° C., a mixed gas 3 of nitrosyl chloride and hydrogen chloride in which more than 20% by weight of the former is contained is obtained. The liquor 5 which comes out from the reaction apparatus 1 becomes a composition containing 5–35% by weight of nitrosylsulfuric acid, 2–12% by weight of water, and also sulfuric acid, a minute quantity of dissolved nitrosyl chloride and hydrogen chloride.

By feeding the liquor 5 to a dehydrating apparatus 6 and boiling the liquor 5 under the conditions of a temperature of 120–250° C. and a degree of vacuum of 20–30 mm. Hg absolute, dehydration is effected, the water being discharged as an aqueous liquor 7 in which not more than 15% by weight of sulfuric acid is contained. The liquor 8 leaving the dehydrating apparatus 6 is the liquor 5 from which the water has been removed. By causing this liquor 8 to absorb a gas 10 containing oxides of nitrogen and recycling the same as a sulfuric acid solution of nitrosylsulfuric acid the preparation continuously with advantage of nitrosylsulfuric acid in high concentration and at high rates of generation is made possible in accordance with the aforementioned composite method which combines the reaction Equations 1 and 3. The replenishment of the cyclic system with the small amount of sulfuric acid of not more than 15% by weight which was contained in the liquor 7 that was discharged may be accomplished during any of the steps of the cyclic system.

Also of importance is that, in a sulfuric acid solution of nitrosylsulfuric acid, as the water content and the content of the nitrosylsulfuric acid increase, the crystal separating temperature rises. This means that in case the temperature is less than 30° C. when the oxides of nitrogen are caused to be absorbed at the apparatus 9, the rate of absorption is exceedingly good, but, on the other hand, when above 50° C., there is a tendency of it to become unsatisfactory. Again, while it is permissible for nitric acid to be contained in an amount of less than 5% by weight, for obtaining nitrosyl chloride in high purity it is best that nitric acid is not contained.

In FIG. 1 the dehydrating apparatus 6 is located next to the nitrosyl chloride generating apparatus, though the location of these may be interchanged. Further, in carrying out the dehydration, instead of employing the dehydrating apparatus 6 of FIG. 1 it is also possible to carry out the dehydration of liquor 5 with a dehydrated inert gas at a temperature of 150–300° C., as already mentioned hereinbefore, but when this method is compared with the process shown in FIG. 1, it is inferior to the latter in that it is not as economical.

While according to this invention the nitrosyl chloride is obtained as mixed gas with hydrogen chloride, this can be utilized as such, for example, in preparing the hydrochloride salts of cyclohexanone oximes by the photochemical reaction of cyclohexanone with nitrosyl chloride. On the other hand, when nitrosyl chloride alone is needed, the gas in which the two components are present as a mixture can be cooled to obtain the nitrosyl chloride as a liquid, after which by effecting low temperature distillation according to conventional technique nitrosyl chloride can be obtained in still greater purity.

To further illustrate the present invention, the following examples are given showing several modes of practicing the invention. It is to be understood that these examples are intended in an illustrative sense and are not in limitation of the invention. Unless otherwise indicated, all quantities in the examples are on a weight basis.

EXAMPLE 1

Experiment A

A reactor of about 200 cc. capacity was charged with 200 grams of a solution comprising 42% of nitrosylsulfuric acid, 54.5% sulfuric acid and 3.5% water, and while maintaining a temperature of 80° C., hydrogen chloride gas was jetted into the solution at the rate of 30 cc. per minute. As a result, a mixed gas of nitrosyl chloride and hydrogen chloride was generated as the formed gas and the concentration of nitrosylsulfuric acid in the sulfuric acid solution gradually decreased. When the concentration of nitrosyl chloride in the gas generated and the concentration of the nitrosylsulfuric acid in the sulfuric acid solution was determined at specified intervals after starting of the generation of gas, the results were as shown in Table VIII.

TABLE VIII

| Time Elapsed Since Start of Generation (min.) | Concentration of Nitrosyl Chloride in Gas Formed (vol. percent) | Concentration of Nitrosylsulfuric Acid in Sulfuric Acid Solution (wt. percent) |
|---|---|---|
| 10 | 52.7 | 38.7 |
| 20 | 39.1 | 34.4 |
| 30 | 27.5 | 31.2 |
| 45 | 18.6 | 27.8 |
| 60 | 13.7 | 23.8 |
| 120 | 5.75 | 19.6 |
| 180 | 3.73 | 16.7 |

Experiment B

Next, except that the same reactor was charged with a solution comprising 42% of nitrosylsulfuric acid, 53% of sulfuric acid and 5% of water, the reaction was carried out under identical conditions as in Experiment A. The results obtained were as shown in Table IX, below.

TABLE IX

| Time Elapsed Since Start of Generation (min.) | Concentration of Nitrosyl Chloride in Gas Formed (vol. percent) | Concentration of Nitrosylsulfuric Acid in Sulfuric Acid Solution (wt. percent) |
|---|---|---|
| 10 | 74.1 | 37.4 |
| 20 | 56.6 | 32.6 |
| 30 | 28.9 | 28.6 |
| 45 | 24.4 | 23.8 |
| 60 | 16.6 | 21.0 |
| 120 | 5.83 | 14.0 |
| 180 | 3.63 | 11.2 |

Experiment C

Further, for purpose of comparing with the foregoing experimental results, the reaction was carried out by charging, as above, a reactor of about 200 cc. capacity with a sulfuric acid solution of nitrosylsulfuric acid containing no water at all, i.e., a solution the composition of which was 42% nitrosylsulfuric acid and 58% sulfuric acid, otherwise the conditions being completely identical as in the foregoing Experiments A and B. The results obtained were as shown in Table X, below.

TABLE X

| Time Elapsed Since Start of Generation (min.) | Concentration of Nitrosyl Chloride in Gas Formed (vol. percent) | Concentration of Nitrosylsulfuric Acid in Sulfuric Acid Solution (wt. percent) |
|---|---|---|
| 10 | 41.9 | 39.9 |
| 20 | 29.2 | 36.6 |
| 30 | 24.5 | 35.3 |
| 45 | 17.6 | 32.1 |
| 60 | 13.3 | 29.8 |
| 120 | 6.97 | 26.4 |
| 180 | 4.91 | 25.0 |

As a result of these Experiments A, B and C, i.e., when a comparison is made of the results shown in Tables VIII, IX and X with the results shown in Table X, the latter being the instance in which no water at all was present in the sulfuric acid solution of nitrosylsulfuric acid, concomitant with an increase in the presence of water, i.e., 3.5% (Table VIII) and 5.0% (Table IX), progressively the concentration of nitrosyl chloride in the gas generated becomes higher for the same reaction time and the concentration of the nitrosylsulfuric acid in the sulfuric acid becomes lower. Furthermore, when the instance in which the concentrations of the nitrosylsulfuric acid in sulfuric acid have declined and have reached about the same level is compared, as compared with the results shown in Table X, the concentration of nitrosyl chloride in the gas formed becomes higher as the presence of water increases from 3.5% (Table VIII) to 5.0% (Table IX).

EXAMPLE 2

A glass-lined reaction tower of an inner diameter of 150 cm. was packed with Raschig rings of 20 mm. length until a height of 5 meters was reached and during the reaction the temperature inside the tower was maintained at 80° C. To this tower was fed from the top at the rate of 300 liters per hour a sulfuric acid solution of nitrosylsulfuric acid of a composition as shown hereinafter and from the bottom of the tower was passed hydrogen chloride gas at the rate of 150 liters per minute. A mixed gas of nitrosyl chloride and hydrogen chloride was obtained.

When the composition of the sulfuric acid solution of nitrosylsulfuric acid was on a weight basis 35% nitrosylsulfuric acid, 60% sulfuric acid and 5% water, the concentration of nitrosyl chloride on a volume basis was about 50%. On the other hand, when the composition on a weight basis of the sulfuric acid solution of nitrosylsulfuric acid fed was 35% nitrosylsulfuric acid and 65% sulfuric acid with no water at all being present, the concentration of nitrosyl chloride on a volume basis was only about 29%.

EXAMPLE 3

A reactor of about 200 cc. capacity was charged with 200 grams of a solution the composition of which was 42% nitrosylsulfuric acid, 48% sulfuric acid and 10% water, and while maintaining a temperature of 130° C., hydrogen chloride gas was jetted into said solution at the rate of 30 cc. per minute.

As a result, a mixed gas of nitrosyl sulfuric acid and hydrogen chloride was generated as the formed gas, and the concentration of nitrosylsulfuric acid in the sulfuric acid solution gradually declined.

When the concentration of nitrosyl chloride in the gas formed was measured at a point 10 minutes after the start of the generation of said formed gas, it was shown to be a high rate of 87.5% by volume. The concentration of nitrosyl chloride in this formed gas gradually declined with the passage of time and at about 180 minutes after start of the generation, practically no generation of nitrosyl chloride was observed.

As is apparent from this experiment, when the water content of the solution comprising nitrosylsulfuric acid, sulfuric acid and water was 10% and the temperature at the time the hydrogen chloride gas was blown into this solution was 130° C., the value for the concentration of nitrosyl chloride far surpassed that of the measurement results of Examples 1 and 2 which were carried out under the conditions in which the reaction temperature was 80° C. and the water contents were 3.5 and 5.0%, i.e. the 52.7% by volume and 74.1% by volume concentrations of nitrosyl chloride in the formed gas 10 minutes after the start of generation of the gas, as shown in Tables VIII and IX, as well as the concentration of about 50% by volume for Example 2. Hence, it is evident that this constitutes one of the optimum water content and reaction temperature conditions of the present invention.

EXAMPLE 4

A reactor of about 200 cc. capacity was charged with 200 grams of a solution the composition of which was 42% nitrosylsulfuric acid, 51% sulfuric acid and 7% water, and while maintaining a temperature of 200° C. hydrogen chloride gas was jetted into said solution at the rate of 30 cc. per minute.

As a result, a mixed gas of nitrosyl chloride and hydrogen chloride was obtained, and the concentration of the nitrosyl chloride in the formed gas was about 83% when measured 10 minutes after the start of the reaction.

EXAMPLE 5

When a cyclic system in accordance with the continuous process illustrated in FIG. 1 was set up, a liquor 5 comprising 11.5 kg. of nitrosylsulfuric acid, 42.3 kg. of sulfuric acid and 3.8 kg. of water was obtained. When this spent liquor was dehydrated at the dehydrating apparatus 6 at 190° C. and 60 mm. Hg absolute a distillate was discharged containing 1.21 kg. of water and 0.14 kg. of sulfuric acid leaving a liquor 8 comprising 11.5 kg. of nitrosylsulfuric acid, 2.59 kg. of water and 42.16 kg. of sulfuric acid. Although in this instance the decomposition of nitrosylsulfuric acid was regularly observed, it was of an extent as could be practically ignored. To replenish this, 0.12 kg. of pure sulfuric acid was added.

When this liquor was cycled to a tank 9 where it was made to absorb a gas 10 of 5° C. containing NO and $NO_2$ which was obtained by ammonia oxidation, a liquor 4 containing 24.12 kg. of nitrosylsulfuric acid, 32.56 kg. of sulfuric acid, and 3.62 kg. of water was obtained. This liquor was conveyed to a reaction apparatus 1 and heated to 100° C. When hydrogen chloride containing 2% of water was passed therein, a formed gas comprising 65.0 kg. of nitrosyl chloride and 4.02 kg. of hydrogen chloride was obtained. The spent liquor 5 then obtained had the original composition, i.e., 11.5 kg. of nitrosylsulfuric acid, 42.3 kg. of sulfuric acid and 3.8 kg. of water. When the resulting mixed gas of nitrosyl chloride and hydrogen chloride was cooled to −6° C., 6.49 kg. of nitrosyl chloride in a purity of 99.98% was obtained. Thus, by repeating the reaction and carrying out the process as described above, it was possible to produce nitrosyl chloride continuously.

Having thus described the nature of the invention, what we claim is:

1. A cyclic method of continuously producing nitrosyl chloride which comprises reacting sulfuric acid with a mixed gas comprising nitrogen monoxide and nitrogen peroxide, the maximum molar ratio of nitrogen peroxide to nitrogen monoxide being about 1:1, to obtain a sulfuric acid solution of nitrosylsulfuric acid, maintaining the water content of said solution within the range of 4–11% by weight by the removal of excess water contained in said solution, reacting said sulfuric acid solution of nitrosylsulfuric acid with substantially anhydrous hydrogen chloride gas at a temperature of 80–200° C. to generate gaseous nitrosyl chloride, and reacting the spent liquor produced in the generation of said nitrosyl chloride with a mixed gas comprising nitrogen monoxide and nitrogen peroxide, the maximum molar ratio of nitrogen peroxide to nitrogen monoxide being about 1:1, to produce a sulfuric acid solution of nitrosylsulfuric acid for further production of nitrosyl chloride.

2. The method of claim 1 wherein the removal of water is effected by vacuum distillation at a temperature of 120–250° C. and a vacuum of 20–300 mm. Hg absolute.

3. The method of claim 1 in which said removal of water is effected by means of blowing a dehydrated inert gas selected from the group consisting of nitrogen, air and carbon dioxide at a temperature of 150–300° C. into said sulfuric acid solution of nitrosylsulfuric acid.

References Cited

UNITED STATES PATENTS

| | | | |
|---|---|---|---|
| 1,930,664 | 10/1933 | Rosenstein | 23—203 |
| 2,123,072 | 7/1938 | Beekhuis | 23—203 |
| 2,855,279 | 10/1958 | Walter | 23—203 |

FOREIGN PATENTS

| | | |
|---|---|---|
| 10,604 | 1894 | Great Britain. |

OSCAR R. VERTIZ, *Primary Examiner.*

MILTON WEISSMAN, B. H. LEVENSON,
*Assistant Examiners.*